United States Patent
DeLuca et al.

(10) Patent No.: US 11,403,007 B2
(45) Date of Patent: Aug. 2, 2022

(54) DIGITAL TWIN TEMPLATE IOT SENSOR PLUGS FOR FASTER OPERATIONAL TWIN SETUP

(71) Applicant: International Business Machines Corporation, Armonk, NY (US)

(72) Inventors: Lisa Seacat DeLuca, Bozeman, MT (US); Bjorn Kutz, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 17/124,737

(22) Filed: Dec. 17, 2020

(65) Prior Publication Data

US 2022/0197522 A1 Jun. 23, 2022

(51) Int. Cl.
*G06F 3/00* (2006.01)
*G06F 3/06* (2006.01)
*G16Y 20/20* (2020.01)
*G16Y 10/75* (2020.01)

(52) U.S. Cl.
CPC .......... *G06F 3/0629* (2013.01); *G06F 3/0604* (2013.01); *G06F 3/067* (2013.01); *G16Y 10/75* (2020.01); *G16Y 20/20* (2020.01)

(58) Field of Classification Search
None
See application file for complete search history.

(56) References Cited

U.S. PATENT DOCUMENTS

| | | | |
|---|---|---|---|
| 2016/0333855 A1 | 11/2016 | Lund | |
| 2018/0054376 A1* | 2/2018 | Hershey | ............... H04L 12/66 |
| 2019/0251575 A1 | 8/2019 | Berti | |
| 2019/0354922 A1 | 11/2019 | Berti | |

FOREIGN PATENT DOCUMENTS

WO 2018038902 A1 3/2018

OTHER PUBLICATIONS

Friedow et al., "Integrating IoT Devices into Business Processes", Jun. 2018, Hasso Plattner Institute, University of Potsdam, Germany, 14 pages.
IBM, "IBM Maximo Asset Monitor", Copyright © 2020 IBM, 1 page, <https://dashboard-beta.connectedproducts.internetofthings.ibmcloud.com>.
IBM, "IBM Watson IoT Platform—Overview—United States", printed on Sep. 8, 2020, 1 page, <https://www.ibm.com/us-en/marketplace/internet-of-things-cloud>.
Mell et al., "The NIST Definition of Cloud Computing", National Institute of Standards and Technology U.S. Department of Commerce, Special Publication 800-145, Sep. 2011, 7 pages.

* cited by examiner

*Primary Examiner* — Midys Rojas
(74) *Attorney, Agent, or Firm* — Stephen R. Yoder

(57) ABSTRACT

Streamlining the process of connecting a digital twin template to a set of sensors that are connected to a physical asset so that an owner and/or operator of the physical asset receives an asset operational indication. The asset operational indication provides useful information to the owner and/or operator by providing real-time data pertaining to the physical asset so that the owner and/or operator can make measured and informed decisions relating to the current and/or future uses of the physical asset.

18 Claims, 5 Drawing Sheets

US 11,403,007 B2

DIGITAL TWIN TEMPLATE IOT SENSOR PLUGS FOR FASTER OPERATIONAL TWIN SETUP

BACKGROUND

The present invention relates generally to the field of the Internet of Things (IoT), and more particularly to the use of an operating digital twin that is associated with a physical asset that is structured and/or configured to be used as an IoT device.

The Wikipedia entry for "Digital twin" (as of Oct. 16, 2020) (the "Entry") states as follows: "A digital twin is a digital replica of a living or non-living physical entity. Digital twin refers to a digital replica of potential and actual physical assets (physical twin), processes, people, places, systems and devices that can be used for various purposes. The digital representation provides both the elements and the dynamics of how an Internet of things (IoT) device operates and lives throughout its life cycle."

The Entry further states as follows: "Definitions of digital twin technology used in prior research emphasize two important characteristics. Firstly, each definition emphasizes the connection between the physical model and the corresponding virtual model or virtual counterpart. Secondly, this connection is established by generating real-time data using sensors . . . . . Digital twins integrate IoT, artificial intelligence, machine learning and software analytics with spatial network graphs to create living digital simulation models that update and change as their physical counterparts change. A digital twin continuously learns and updates itself from multiple sources to represent its near real-time status, working condition or position. This learning system learns from itself, using sensor data that conveys various aspects of its operating condition; from human experts, such as engineers with deep and relevant industry domain knowledge; from other similar machines; from other similar fleets of machines; and from the larger systems and environment of which it may be a part. A digital twin also integrates historical data from past machine usage to factor into its digital model."

SUMMARY

According to an aspect of the present invention, there is a method, computer program product and/or computer system that performs the following operations (not necessarily in the following order): (i) receiving a plurality of Internet of Things (IoT) entries, with the plurality of IoT entries including information indicative of identities of digital twin template for a set of physical assets; (ii) identifying a first set of IoT entries from the plurality of IoT entries in a digital twin specification based, at least in part, upon an identity of a first physical asset from the set of physical assets to obtain a first identified set of IoT entries; (iii) responsive to the identification, for each given IoT entry of the first identified set of IoT entries, receiving, by the digital twin for the first physical asset and from a sensor feed attached to the first physical asset, sensor feed data related to the first physical asset; and (iv) responsive to the receipt of the sensor feed data related to the first physical asset, providing an asset operational indication for the first physical asset.

DETAILED DESCRIPTION

Figure 1:
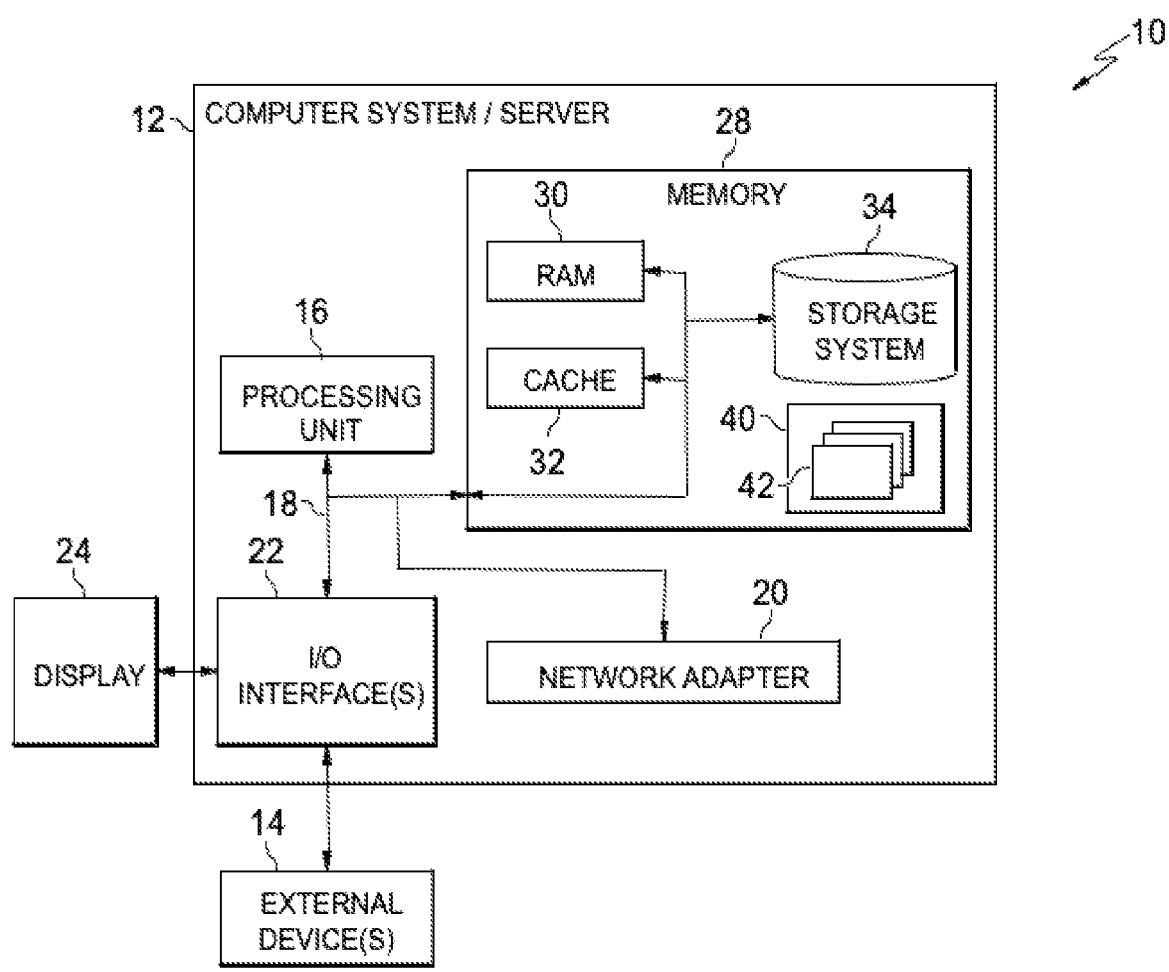
FIG. 1 depicts a cloud computing node used in a first embodiment of a system according to the present invention.

Some embodiments of the present invention are directed to streamlining the process of connecting a digital twin template to a set of sensors that are connected to a physical asset so that an owner and/or operator of the physical asset receives an asset operational indication. The asset operational indication provides useful information to the owner and/or operator by providing real-time data pertaining to the physical asset so that the owner and/or operator can make measured and informed decisions relating to the current and/or future uses of the physical asset.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
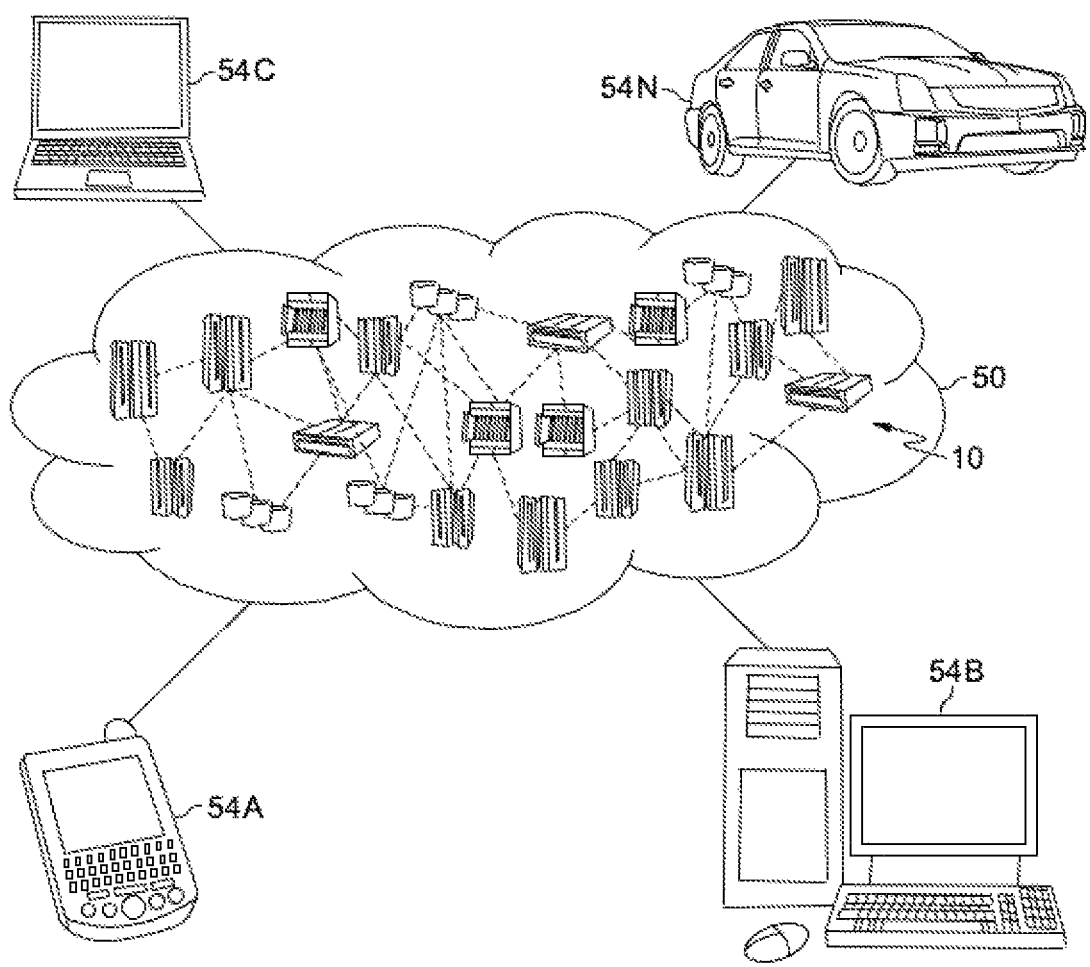
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
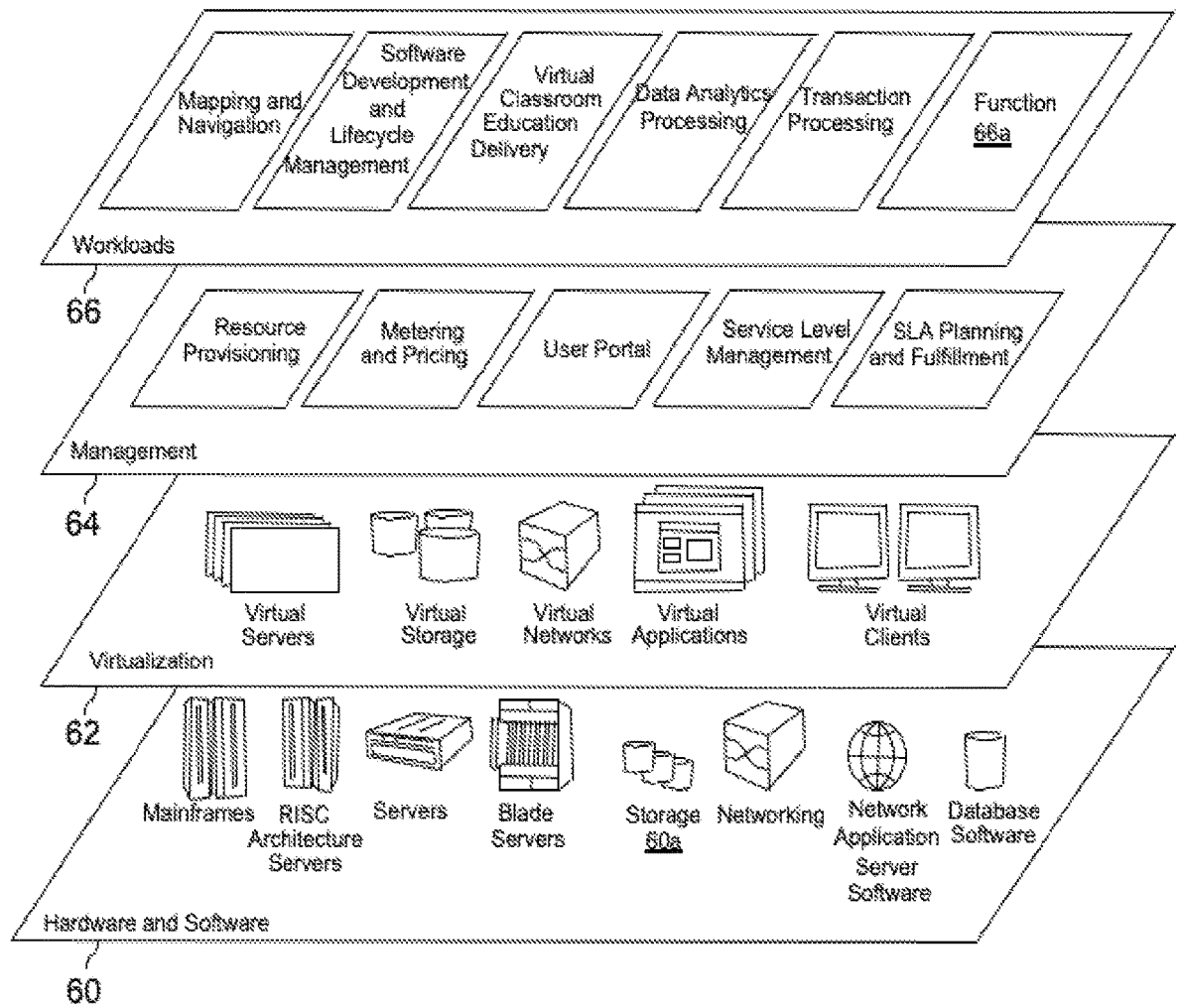
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 4:
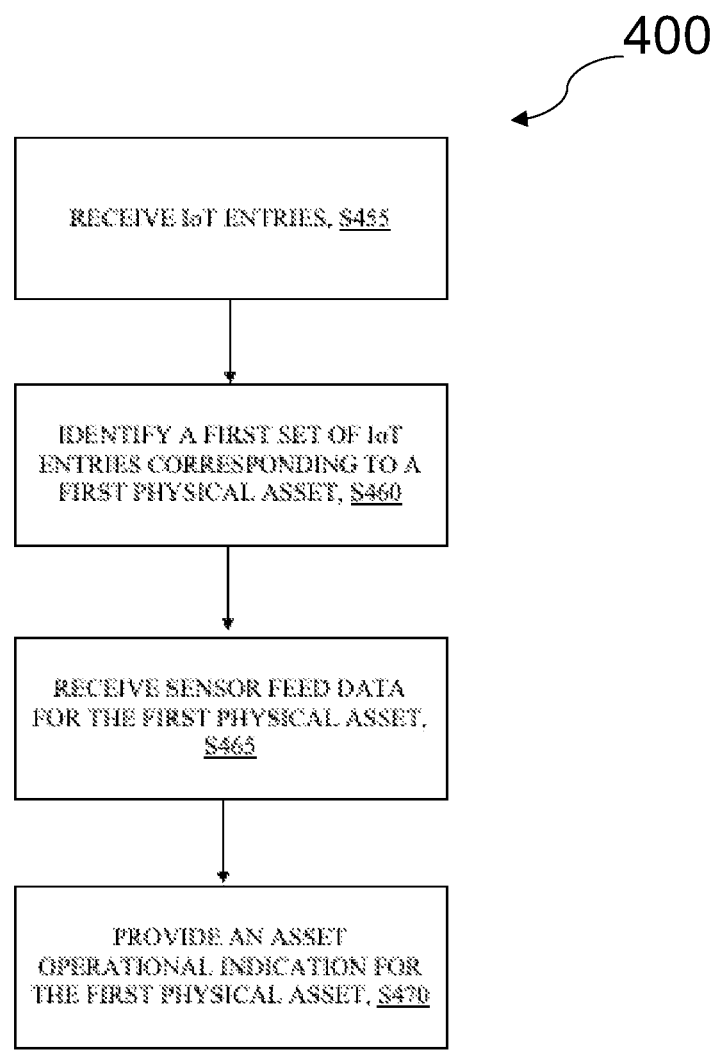
FIG. 4 is a flowchart showing a first embodiment method performed, at least in part, by the first embodiment system.
Figure 5:
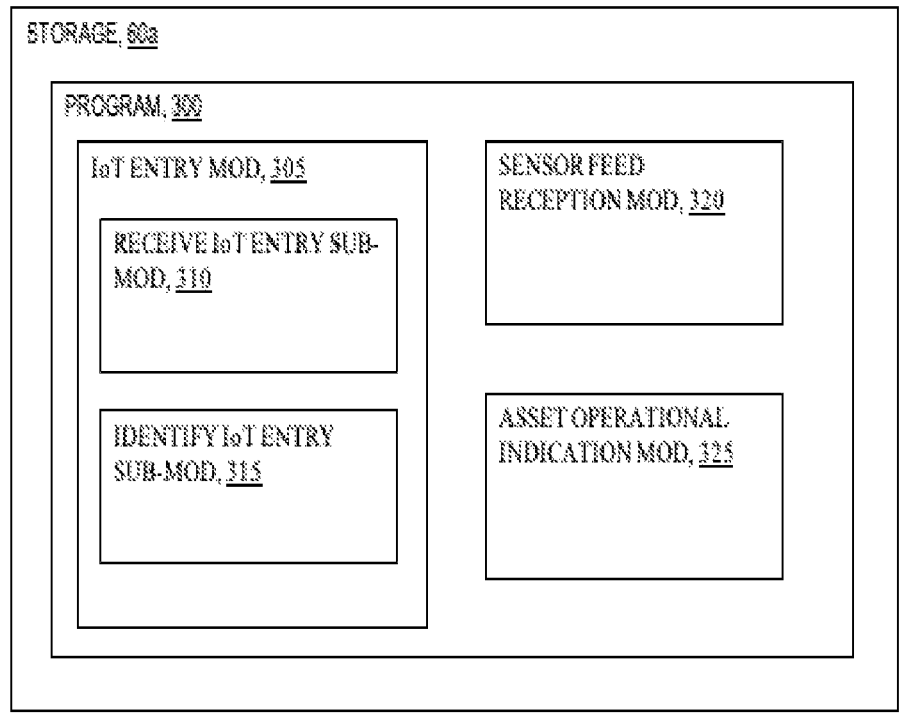
FIG. 5 is a block diagram showing a machine logic (for example, software) portion of the first embodiment system.

FIG. 4 shows flowchart 450 depicting a method according to the present invention. FIG. 5 shows program 300 for performing at least some of the method operations of flowchart 450. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60a (see FIG. 3).

Processing begins at operation S455, where receive IoT entry sub-module ("sub-mod") 310 of IoT entry module ("mod") 305 receives a series of IoT entries that correspond to data collected by, for and/or about multiple physical assets or a single physical asset. In some embodiments of the present invention, the series of IoT entries includes data that is collected in real-time by a set of sensors that are attached and/or otherwise integrated on a single physical asset. For example, if a physical asset (such as a single mining truck) contains five sensors, the series of IoT entries that is received by receive IoT entry sub-mod 310 includes all of the data that is collected in real time by all five of those sensors. Alternatively, if there are multiple physical assets of a single type (such as five mining trucks) that are each equipped with five sensors, then the series of IoT entries that is received by receive IoT entry sub-mod 310 includes all of the data that is collected in real time by all twenty-five (25) sensors.

Processing proceeds to operation S460, where identify IoT entry sub-mod 315 of IoT entry mod 305 identifies a relevant sub-set of IoT entries that are received from operation S455, above. The relevant sub-set of IoT entries that are identified correspond to data collected by, for and/or about a physical asset for which a given user wishes to set up a digital twin system to monitor activities that are being performed by the physical asset or, in some cases, to assess and/or monitor the health of the physical asset. In some embodiments of the present invention, identify entry sub-mod 315 identifies the relevant IoT entries that are received (as described in connection with operation S455, above) based upon specifications that are provided by a user of the physical asset. For example, if the physical asset is a single mining truck (from the example described above in connection with operation S455), the user can specify that only data from three (3) specified sensors need to be collected. In this example, identify IoT entry sub-mod 315 would sort through all of the received IoT entries and identify only the IoT entries that are correspond to the three specified sensors.

Processing proceeds to operation S465, where sensor feed mod 320 receives sensor feed data for the physical asset. In some embodiments of the present invention, the sensor feed data for the physical asset represents a connectivity placeholder for a digital twin template. From the example above, the data received from the three (3) physical sensors on the single mining truck are represented by three (3) connectivity placeholders that is associated with the digital twin. This way, when the sensor feed data is received by sensor feed mod 320, the user of the digital twin can use the sensor feed data that is received in real-time to monitor the status of the physical asset that is associated with the digital twin.

Processing finally proceeds to operation S470, where asset operational indication mod 325 provides an asset operational indication for the physical asset. In some embodiments of the present invention, the asset operational indication for the physical asset is determined in part upon the aggregated sensor feed data that is received (as described in connection with operation S465, above) and that is statistically significant to be able to indicate a particular status of the physical asset with a high degree of confidence. In some embodiments, the asset operational indication is shown through a visual indication. Alternatively, the asset operational indication is determined through audible cues. In some embodiments, there is a key that maps several audible cues to show the correspondence between a particular audible cue and a unique indicator related to the physical asset (such as the health and/or current use of the physical asset).

III. FURTHER COMMENTS AND/OR EMBODIMENTS

Some embodiments of the present invention recognize the following facts, potential problems and/or potential areas for improvement with respect to the current state of the art: (i) certain digital twin exchanges connects manufacturers and Original Equipment Manufacturers (OEMs) with owners and operators; and/or (ii) types of content that can be found on these exchanges vary in type and ultimate depend on the desired business value from having and/or using these resources found in these exchanges.

Examples of these types of content include, but are not necessarily limited to, the following: bill of materials, parts list, user manuals, engineering manuals, fault codes, 2-dimensional/3-dimensional computer aided design (CAD) files, artificial reality/virtual reality models, maintenance manuals, maintenance plans, operating model(s), remote procedures for the technician of the future, stocking strategy, forecast models, building information models (BIM), and/or service manuals.

In some instances, industry analysts call these types of content (or files) "digital twin templates" because they are repeatable and replicable to any physical asset instead of a specific instance of a physical asset. These files are the stepping stones to building out an "operating twin" that has a 1-to-1 corresponding relationship between a digital and physical asset. However, clients typically require more, including a complete view of the asset, the simulation twin complete with IoT sensor readings, and the ability to actuate. Because of these requirements, what is needed is a way to connect a digital twin template easily to sensors that are part of the asset to complete the operating digital twin.

Some embodiments of the present invention include a method and system for a digital twin resource specification process for use with IoT sensor connection points. In one embodiment, when a digital twin template is purchased or otherwise acquired, the digital twin can be connected to IoT sensor data feeds such that the digital twin owner and operator can recognize when that digital twin is "complete" and can quickly instantiate the operating digital twin with real sensor data (and in some cases, real-time sensor data).

In some embodiments of the present invention, a digital twin is created as a digital representation of a physical asset, equipment, building, or vehicle. A digital twin content store holds the resources that help to create the digital twin. As mentioned above, the digital twin content store includes digital twin related resources including, but not necessarily limited to, the following: manuals, bill of material(s), list of parts, manufacture date/age data, modernization status data, refurbished status data, manufacturing warranty notifications, warranty claims data, insurance claims data, insurer identity data, insurance policy data, maintenance plans, maintenance history data, inspection history data, specifications (such as specification to print a part in three-dimensions using a three-dimensional printer), three-dimensional model/CAD drawings, engineering change history data, fault codes, scheduled maintenance plans, operating manuals, sensor data, operating history, predictive operating manuals (using artificial intelligence (AI) and other computer-based prediction techniques), owner identity data, and/or change in ownership (of an asset) data.

In some embodiments of the present invention, the associated physical asset for the digital twin has a set of sensors. These sensors are defined: (i) within product literature (such as manuals or API documentation); (ii) manually by the digital twin resource content creator; and/or (iii) through monitoring of the data output of the physical asset over time. In some embodiments, these sensor feeds represent a connectivity placeholder within the digital twin template (for example, with five sensor feeds corresponding to five connectivity placeholders).

The connectivity placeholder is associated with the overall digital twin that is made up of a collection of the resources (mentioned above). In one embodiment, the digital twin resource(s) listed within the content store is acquired by a first company. Upon acquisition, the system prompts for the mapping of a sensor feed to each of the connectivity placeholders. This mapping between the sensor feeds and the connectivity placeholders has a pre-defined corresponding relationship (such as a 1:1 correspondence). Additionally, the mapping between the sensor feeds and the connectivity placeholders can be defined by: (i) the information included in the content repository tool (such as a proprietary digital twin exchange); (ii) the information included in a proprietary asset monitoring tool; and/or (iii) both of the above.

In some embodiments of the present invention, as the sensor feed changes, the associated digital twin captures the sensor output to generate a truly operating digital twin. Because the sensor feeds are organized and configured as a group, multi-sensor views and analytics can become standardized, thereby making it easier to understand operations, performance, and maintain the data across a variety of sources.

In some embodiments of the present invention, the digital twin can visually reflect that it has been transformed into an operating twin. This could be done through the following: (i) an icon (such as a green check mark symbol); (ii) styling changes; (iii) filtering within content repository (such as sorting on operating twins versus template twins); and/or (iv) analytics dashboards and monitoring output being shown within the content repository. In the event that a sensor breaks, is replaced, or is part of a component or sub-system that is replaced, the connectivity placeholder corresponding to the broken or replaced sensor is adjusted to maintain the history and contextual information about the sensor feed in relation to the physical asset.

A practical example of one manner of implementing certain embodiments of the present invention will now be discussed.

In this example, Person A works for an underground mining truck manufacturing company. Person A creates a digital twin resource using conventional methods. However, when Person A goes to offer these digital twin resources to a proprietary digital twin exchange, he or she chooses an option to assign some connectivity placeholders to define how an operating twin for a given asset might be completed. Person A specifies that there needs to be three (3) sensor feeds connected. The specification is then available on the proprietary digital twin exchange and the values are created by the owner/operator who purchases the digital twin template.

Continuing with this example, Person B works for a mining company and searches through the propriety digital twin exchange in search for a bill of materials (BOM) for her truck and finds the requisite BOM, which in this example, happens to be Person A's entry. When Person B purchases the truck, the system prompts Person B to connect to existing sensors on the physical asset. In response to this prompt, Person B connects the physical asset to a proprietary IoT platform service instance. Within the proprietary IoT platform service instance, Person B finds and connects the three sensors that are related to the physical mining truck (mentioned above).

In this example, the digital twin resources that Person B has purchased are connected to an instance of the physical asset and the readings from the sensors attached to the physical asset can begin to build out the operating twin. A software interface that reflects real-time changes from within the proprietary digital twin exchange might show that Person B is connected along with sensor output from a separate proprietary asset monitoring program. Person B can further use this interface to leverage add-on multi-sensor analytics to identify risk patterns and schedule maintenance on the physical asset in order to avoid breakage and downtime.

Some embodiments of the present invention may include one, or more, of the following features, characteristics and/or advantages: (i) providing an operational indication of an asset to a digital twin by detecting one or more Internet of Things (IoT) entries/connectivity placeholders as sensor feeds for the asset; (ii) identifying a set of IoT entries in a digital twin specification for an asset; (iii) processing each entry in the set of IoT entries as sensor feeds related to the asset; (iv) providing the asset operational setup in response to detecting each entry in the set of IoT entries as sensor feeds for the asset, wherein the asset operational setup is provided with a visual indication; (v) processing a replacement sensor in the set of IoT entries by adjusting records related to the asset to include the replacement sensor; and (vi) replace a sensor feed or API stream associated with the sensor to bring the digital twin alive with real-time IoT data for a given physical asset.

In one embodiment of the present invention, there is a method for including Internet of Things (IoT) entries in a digital twin to facilitate an asset operational indication. This method includes at least the following operations (and not necessarily in the following order): (i) identifying a set of IoT entries in a digital twin specification for the asset; (ii) processing each entry in the set of IoT entries as sensor feeds related to the asset; and (iii) responsive to detecting the each entry in the set of IoT entries as sensor feeds for the asset, providing the asset operational indication. In this method, the asset operational indication is provided with a visual indication. Additionally, processing the replacement sensor in the set of IoT entries includes adjusting records related to the asset to include the replacement sensor.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a plurality of Internet of Things (IoT) entries, with the plurality of IoT entries including information indicative of identities of digital twin template for a set of physical assets;
identifying a first set of IoT entries from the plurality of IoT entries in a digital twin specification based, at least in part, upon an identity of a first physical asset from the set of physical assets to obtain a first identified set of IoT entries;
responsive to the identification, for each given IoT entry of the first identified set of IoT entries, receiving, by the digital twin for the first physical asset and from a sensor feed attached to the first physical asset, sensor feed data related to the first physical asset; and
responsive to the receipt of the sensor feed data related to the first physical asset, determining an asset operational indication for the first physical asset, with the asset operational indication for the physical asset being based upon audible cues.

2. The CIM of claim 1 further comprising:
determining that a replacement sensor is required to process sensor feed data related to the first physical asset for the plurality of IoT entries;
replacing a first sensor on the first physical asset with the replacement sensor; and
responsive to the replacement of the first sensor on the first physical asset, adjusting a set of sensor feed data records related to the first physical asset to include a record for sensor feed data processed by the replacement sensor.

3. The CIM of claim 1 wherein the asset operational indication for the first physical asset is based upon aggregated sensor feed data related to the first physical asset.

4. The CIM of claim 1 wherein the sensor feed related to the first physical asset represents a connectivity placeholder within a digital twin template.

5. The CIM of claim 1 wherein the sensor feed data related to the first physical asset includes real-time data related to a first operation of the first physical asset.

6. The CIM of claim 1 wherein the sensor feed data related to the first physical asset includes information indicative of risk patterns associated with the first physical asset, with the risk patterns including a likelihood that the first physical asset needs to be repaired.

7. A computer program product (CPP) comprising:
a machine readable storage device; and
computer code stored on the machine readable storage device, with the computer code including instructions and data for causing a processor(s) set to perform operations including the following:
receiving a plurality of Internet of Things (IoT) entries, with the plurality of IoT entries including information indicative of identities of digital twin template for a set of physical assets,
identifying a first set of IoT entries from the plurality of IoT entries in a digital twin specification based, at least in part, upon an identity of a first physical asset from the set of physical assets to obtain a first identified set of IoT entries,
responsive to the identification, for each given IoT entry of the first identified set of IoT entries, receiving, by the digital twin for the first physical asset and from a sensor feed attached to the first physical asset, sensor feed data related to the first physical asset, and
responsive to the receipt of the sensor feed data related to the first physical asset, determining an asset operational indication for the first physical asset, with the asset operational indication for the physical asset being based upon audible cues.

8. The CPP of claim 7 further comprising:
determining that a replacement sensor is required to process sensor feed data related to the first physical asset for the plurality of IoT entries;
replacing a first sensor on the first physical asset with the replacement sensor; and
responsive to the replacement of the first sensor on the first physical asset, adjusting a set of sensor feed data records related to the first physical asset to include a record for sensor feed data processed by the replacement sensor.

9. The CPP of claim 7 wherein the asset operational indication for the first physical asset is based upon aggregated sensor feed data related to the first physical asset.

10. The CPP of claim 7 wherein the sensor feed related to the first physical asset represents a connectivity placeholder within a digital twin template.

11. The CPP of claim 7 wherein the sensor feed data related to the first physical asset includes real-time data related to a first operation of the first physical asset.

12. The CPP of claim 7 wherein the sensor feed data related to the first physical asset includes information indicative of risk patterns associated with the first physical asset, with the risk patterns including a likelihood that the first physical asset needs to be repaired.

13. A computer system (CS) comprising:
a processor(s) set;
a machine readable storage device; and
computer code stored on the machine readable storage device, with the computer code including instructions and data for causing the processor(s) set to perform operations including the following:
receiving a plurality of Internet of Things (IoT) entries, with the plurality of IoT entries including information indicative of identities of digital twin template for a set of physical assets,
identifying a first set of IoT entries from the plurality of IoT entries in a digital twin specification based, at least in part, upon an identity of a first physical asset from the set of physical assets to obtain a first identified set of IoT entries,
responsive to the identification, for each given IoT entry of the first identified set of IoT entries, receiving, by the digital twin for the first physical asset and from a sensor feed attached to the first physical asset, sensor feed data related to the first physical asset, and
responsive to the receipt of the sensor feed data related to the first physical asset, determining an asset operational indication for the first physical asset, with the asset operational indication for the physical asset being based upon audible cues.

14. The CS of claim 13 further comprising:
determining that a replacement sensor is required to process sensor feed data related to the first physical asset for the plurality of IoT entries;
replacing a first sensor on the first physical asset with the replacement sensor; and
responsive to the replacement of the first sensor on the first physical asset, adjusting a set of sensor feed data records related to the first physical asset to include a record for sensor feed data processed by the replacement sensor.

15. The CS of claim 13 wherein the asset operational indication for the first physical asset is based upon aggregated sensor feed data related to the first physical asset.

16. The CS of claim 13 wherein the sensor feed related to the first physical asset represents a connectivity placeholder within a digital twin template.

17. The CS of claim 13 wherein the sensor feed data related to the first physical asset includes real-time data related to a first operation of the first physical asset.

18. The CS of claim 13 wherein the sensor feed data related to the first physical asset includes information indicative of risk patterns associated with the first physical asset, with the risk patterns including a likelihood that the first physical asset needs to be repaired.

\* \* \* \* \*